United States Patent

[11] 3,628,311

[72] Inventors Nino F. Costarella;
 Anthony A. Giuffre, both of Milwaukee, Wis.
[21] Appl. No. 839,383
[22] Filed July 7, 1969
[45] Patented Dec. 21, 1971
[73] Assignee Nino's Inc.
 Milwaukee, Wis.

[54] AIR PURIFICATION SYSTEMS
 4 Claims, 4 Drawing Figs.
[52] U.S. Cl. .................................................. 55/223,
 55/228, 55/240, 98/115 K, 261/117, 261/118
[51] Int. Cl. ...................................................... B01d 47/06
[50] Field of Search .......................................... 55/223,
 228, 240; 98/115 KH; 261/115, 117, 118

[56] References Cited
UNITED STATES PATENTS

| | | | |
|---|---|---|---|
| 2,266,335 | 12/1941 | Roche, Jr. et al. | 261/118 X |
| 2,392,038 | 1/1946 | Gaylord | 98/115 K |
| 2,546,259 | 3/1951 | Fenn | 55/240 X |
| 2,813,477 | 11/1957 | Gaylord | 98/115 X |
| 3,324,629 | 6/1967 | Graswich et al. | 98/115 K |
| 3,330,231 | 7/1967 | Spencer | 55/240 X |
| 3,490,206 | 1/1970 | Doane | 55/242 |
| 3,518,817 | 1/1970 | Dell'Agnese et al. | 55/260 X |

Primary Examiner—Tim R. Miles
Assistant Examiner—Steven H. Markowitz
Attorney—Mann, Brown, McWilliams & Bradway ABSTRACT: A ventilating hood and duct structure for stoves wherein a baffle and water spray arrangement within the hood forces the smoke to pass through successive water curtains. Grease and other impurities are drained from the hood structure through a rectangular trough which overlies the fire area.

PATENTED DEC 21 1971
3,628,311
SHEET 1 OF 4
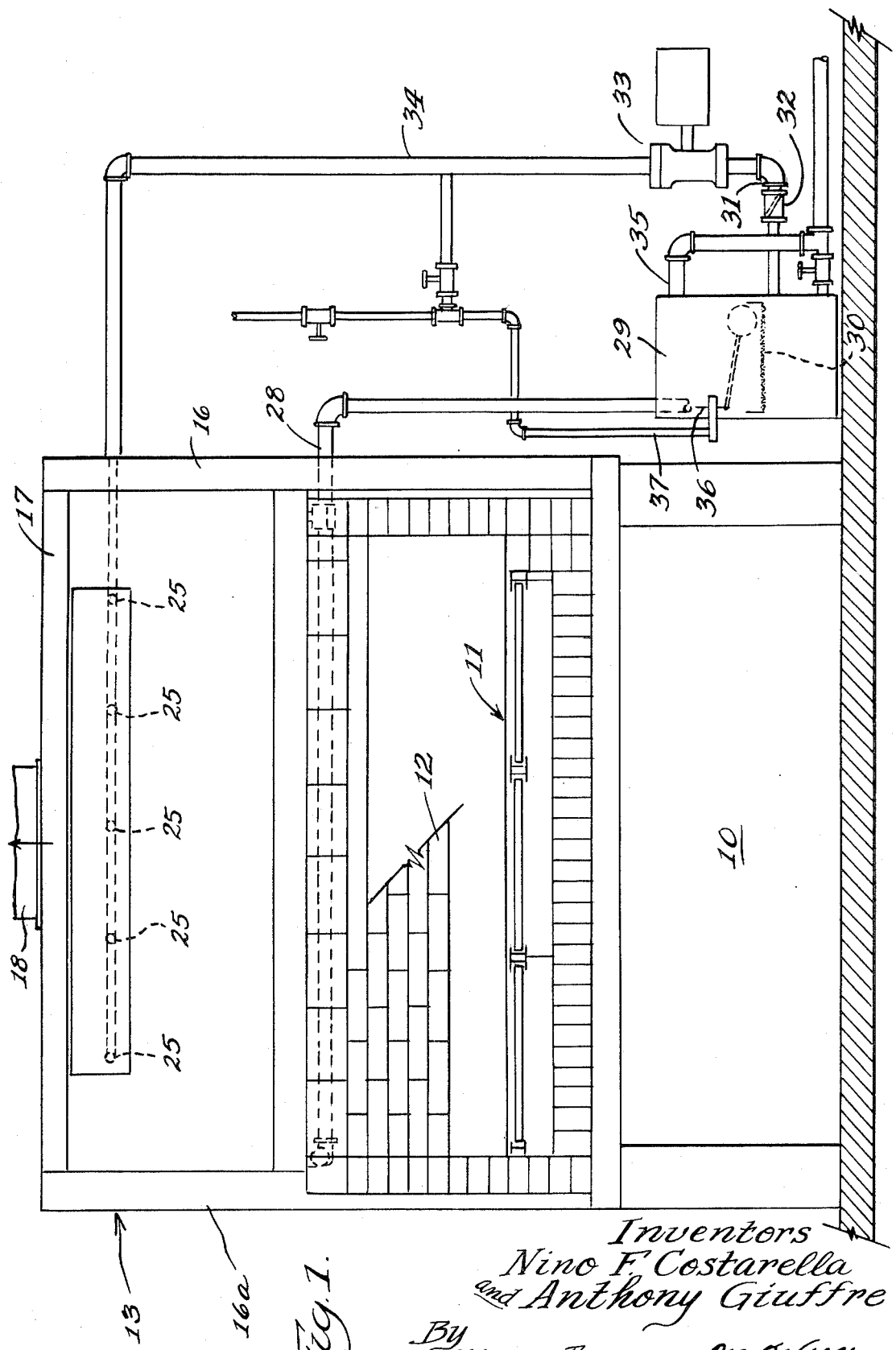
Fig. 1.
Inventors
Nino F. Costarella
and Anthony Giuffre
By
Mann, Brown & McWilliams
Attys.

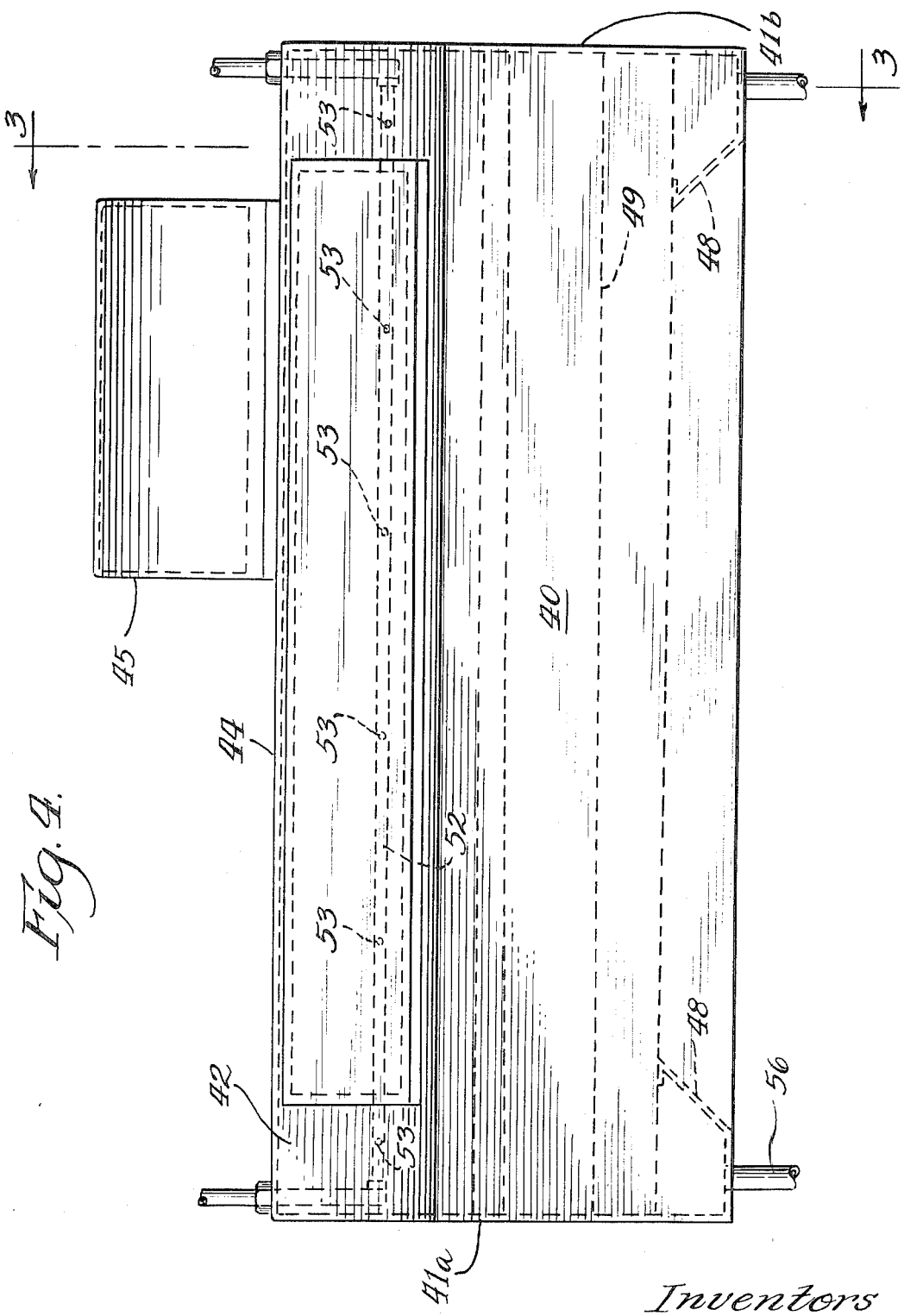

AIR PURIFICATION SYSTEMS

The present invention is directed to new and useful improvements in ventilating and air purifier structures associated with cooking stoves.

Various forms of baffle and grease collecting trough structures have been known for use with stoves for many years. The baffle structures are arranged in the ventilators. Baffles have been arranged within the ventilating duct and hood structure to cause smoke from the stove to follow various paths so that grease particles carried by the smoke may be deflected against baffle surfaces from whence they may drain into some form of a collecting trough. In some of these prior structures water sprays have been associated with the duct structure so that the smoke must pass through a mist or curtain of water which serves to remove soot and grease particles entrapped in the airstream in a manner known to the gas purification and paint spray booth arts.

Units of this general type have been proposed for use with barbecuelike fires in which charcoal is burned to produce the heat for the stove grill. The smoke emitted from such fires is usually heavily laden with soot and grease particles and prior hood and baffle structures have not been as effective as desired in removing soot, grease and other impurities from the airflow.

With the foregoing in mind the major purpose of the present invention are to arrange a ventilating hood, baffle and duct structure for use with charcoal fires in such a manner that water sprays within the ductwork are highly effective in removing grease and soot particles from the airstream carrying the smoke from the fire and in such a manner as to minimize fire hazards, while arranging such a system for use with or without cleansing detergents for the water spray and arranging the system so that impurities are easily separated from the water circulating system.

These and other purposes will be come more apparent in the course of the ensuing specification and claims when taken with the accompanying drawings in which:

FIG. 1 is a front view of a ventilating hood and duct structure incorporating the principles of the present invention;

FIG. 4 is a front view of the hood structure illustrated in FIG. 3.

Like elements are designated by like characters throughout the specification and drawings.

Figure 2:
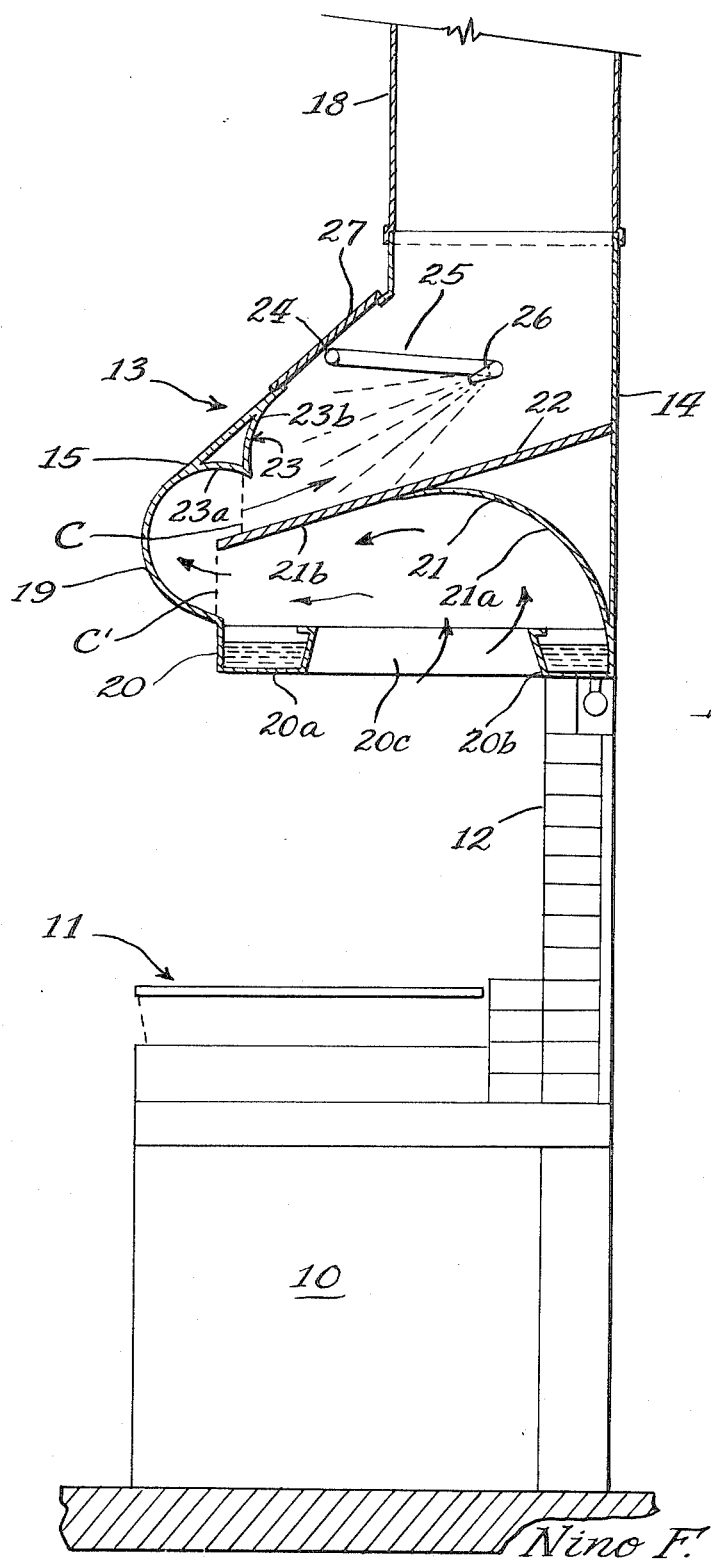
FIG. 2 is a side view of the structure illustrated in FIG. 1.

With reference now to the drawings, and in the first instance to FIG. 1, the numeral 10 generally designates a stove which has a customary grill 11 positioned above burners or an open flame produced by charcoal. The stove has a backwall comprised of firebrick 12 extending upwardly above the grill 11 at the rear of the stove. It should be understood that the stove illustrated in the drawings is intended to be representative of well known conventional forms of stoves or broilers.

In accordance with the present invention, a ventilating hood generally designated 13 is positioned above the stove structure. The hood 13 may rest upon the upper wall of the firebrick 12. It may be supported from a wall, ceiling or other means. The hood is downwardly open and is generally defined by a rear wall 14 which extends vertically from the firebrick 12, a front wall 15 which is downwardly and forwardly inclined, and sidewalls 16 and 16a which extend between the front and rear walls. The sidewalls 16 and 16a are positioned a distance apart sufficient to span the entire length of the grill, although the hood may span a greater or lesser portion of the area of the grill. The hood also includes a top wall 17 which spans the front, rear and sidewalls in an overlying relation. An outlet duct 18 is joined to the top wall 17 at a point generally centrally of the top wall 17 and serves to exhaust smoke from the hood to the exterior. A ventilating fan may be positioned in the duct 18 for purposes of inducing a flow of air through the bottom of the hood and outwardly through the duct 18.

In accordance with the present invention, the lower portion of the front wall 15 has a downwardly and outwardly convex lower portion which terminates in a trough 20. Trough 20 is generally rectangular when viewed in plan and extends completely around the rear wall, front wall, and both sidewalls. The space within the front, rear and side portions 20a, 20b, 20c and 20d of the trough defines an air flow or smoke flow space for entry into the ventilating hood. In further accordance with the invention, a first baffle structure 21 is positioned in overlying relation to the flow area between the walls of the trough. Baffle 21 extends from the rear wall 14 at its point of juncture with the rear section 20b of the trough to a point spaced above the forward portion of the trough section 20a. This baffle structure extends for the entire length of the hood and between both sidewalls 16 and 16a. Baffle 21 is preferably formed with a first downwardly and forwardly concavely curved portion 21a which merges with a plane section 21b. Another baffle section 22 is coplanar with section 21 and extends upwardly and rearwardly from the point of juncture of the portions 21a and 21b to a point of connection with the rear wall 14. The baffle portions 21b and 21a may be formed as a single piece bent in the curvature shown and described or baffle portion 21a may be provided from one curve piece while the portion 21b and the plate 22 are defined from a single metal plate.

A second baffle 23 projects inwardly from the downwardly and forwardly inclined portion of the front wall 15 and projects inwardly to a location spaced above the baffle portion 21b. Baffle 23 also extends for the full length of the hood and between the sidewalls 16 and 16a. Baffle 23 is preferably formed with a more of less V-shaped cross section as illustrated with the sides of the V being curved gradually. The forward side 23a of the baffle 23 preferably has a downwardly concave curvature formed generally as a continuation of the curvature of the lower portion 19 of the front wall. The positioning of the baffle 23 above the baffle 21b together with the curvature of the front wall surface portion 19 and surface portion 23a of baffle 23 forces air flowing upwardly within the baffle to reverse directions. The curvature imparted by the baffle 23a generally directs the flow of air toward the upper surface of baffle portion 21b.

In further accordance with the invention, a water supply pipe or header 24 extends within the hood adjacent the inner surface of the front wall 13 and at a location above the baffle 23. This header 24 has branch supply pipes 25 extended inwardly to a position generally midway between the front and rear walls and each branch supply pipe carries a forwardly directed nozzle 26 as illustrated. Five such branch supply pipes 25 and nozzles 26 are positioned along the length of the hood at locations such that the nozzles are equally spaced along the length of the hood for dispersal of water generally uniformly throughout the length of the hood.

The nozzles 26 are of a type which produces a fine mistlike spray of water in a generally conical pattern. The nozzles 26 are directed toward the rearwardly facing surface 23b of baffle 23. The spray, which, as indicated in dotted lines, impinges against the inner surface of the front wall, against baffle surface 23b and against the upper surface of baffle 21b. Some of the mist may be directed through the space between the lower edge of baffle 23 and the upper surface of baffle portion 21b and against the inner surface of the lower portion 19 of the front wall.

An opening may be provided in the front wall 15 of the hood at an area overlying the supply pipe 24 and may be closed by a cover 27 so as to permit inspection of the interior of the assembly from time to time.

With the nozzles positioned as illustrated and supplied with water, air or smoke flowing upwardly within the hood structure is forced to pass through the mistlike spray emitted from the nozzles throughout the length of the hood. A water curtain is formed between the lower edge of baffle 23 and baffle 21 as designated at C by reason of water draining down the baffle surface 23b to the baffle 21b. Another water curtain C' is defined between baffle 21b and the forward trough section 20a. Water draining from the curtain C' and from the inner surface of the lower portion 19 of the front wall drains into the trough 20 from whence it may be removed by a drain pipe 28.

In the operation of the structure as thus described, water is constantly circulated to the nozzles 26 and the nozzles emit the mistlike spray to produce the water curtain C and C'. Air and smoke, which from a charcoal broiler is relatively heavily laden with soot and grease particles, is forced to flow upwardly within the space defined by the walls of the trough whereupon the baffle 21 constrains the air to flow in a more or less curvilinear and lateral direction through the lower water curtain C'. The air and smoke then is forced to reverse direction for flow through the water curtain C. The air and smoke then is constrained to flow through the fine mistlike spray emitted from the nozzles 26. The flow of the air and smoke through the successive water curtains C' and C causes the water curtains to collect the particles of grease and soot, dirt and the like which are carried in the smoke and airstream. Final cleansing of the smoke and airstream occurs as the smoke and airstream passes through the mistlike spray from the nozzles 26. The impurities deposited in the water are carried downwardly by the baffle structures to a point of drainage into the trough 20.

The drain water may be continuously emptied into some suitable drain system or it may be circulated through a separating system so that the impurities are cleaned from the water and the water is then recirculated through the nozzles 26. For example, drain line 28 may lead to a receptacle 29. Receptacle 29 may have a relatively fine screen 30 disposed across the lower portion thereof so as to collect impurities thereon. A fresh water supply line 31 leads from the bottom of the receptacle through a check valve 32 and through a recirculating pump 33 which recirculates the cleaned water through a supply line 34 to the header 24. The upper part of the receptacle may include an overflow outlet 35 to drain off accumulated particles of grease, soot, dirt or the like. A float valve 36 controls the level of fluid within the receptacle as by periodically opening a makeup water line 37 to ensure a predetermined level of liquid within the receptacle 29.

Detergents may be added to the water supply line 34 so that the water carries a detergent therein for mixing with the grease, soot and dirt particles. This provides a continuous cleansing action to the interior of the hood structure and serves to initially break down particles of grease, soot and dirt to an extent such that they are efficiently carried with the water stream. The accumulated sludge defined by the mixture of detergent, grease, dirt and soot floats at the top of the liquid body in the receptacle 29 and is continuously removed therefrom by the drain 35.

Figure 3:
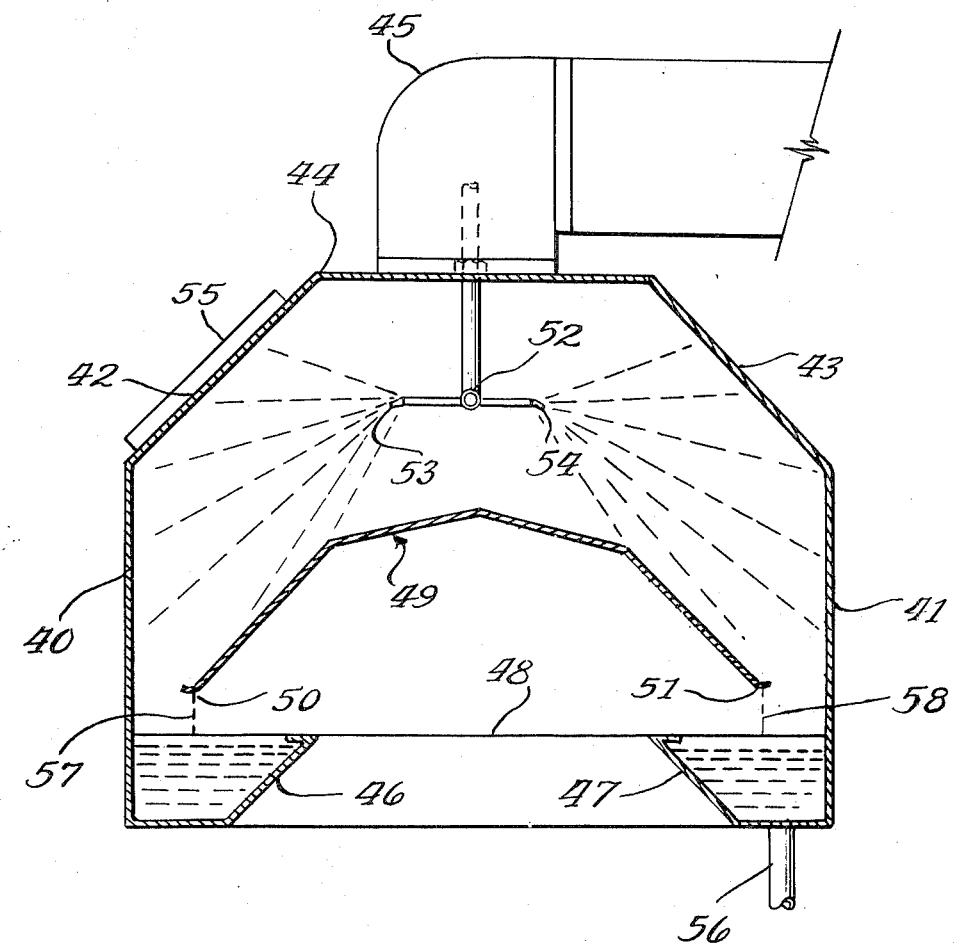
FIG. 3 is a side sectional view of a modified form of air purification hood.

FIG. 3 discloses another embodiment of the invention having a different arrangement of baffle structures, water sprays and curtains from that illustrated in FIGS. 1 and 2. In FIG. 3 a hood is adapted to be supported over a stove in the manner of the hood illustrated in FIGS. 1 and 2. As shown in FIG. 4, the hood extends over substantially the entire upwardly exposed area of the stove and along the full length of the stove as in FIGS. 1 and 2. In FIG. 3 the front wall of the hood structure is designated at 40 and the rear wall is designated at 41. Sidewall structures 41a and 41b are as shown in FIGS. 1 and 2 except that they are shaped so as to fit the different cross-sectional shape of the hood illustrated in FIG. 3. The upper wall may be formed by an inwardly inclined extension of the front wall 40, as at 42, and an inwardly inclined extension of the rear wall 41 as designated at 43. These inwardly inclined portions are joined by a horizontal top plate 44 to which is affixed an exhaust duct 45 which may be positioned medially of the length of the hood structure or off center as appears in FIG. 4. The front and rear walls 40 and 41 as well as the portions 42 and 43 and 44 defining the top wall may be conveniently formed from sheet metal.

In FIG. 3 an upwardly open trough is defined at the lower portions of the front, rear and both sides of the hood as is the case with the water collecting trough in FIGS. 1 and 2. The trough includes a trough section 46 which extends along the inner side of the front wall 40, and a trough section 47 which extends along the inner side of the rear wall 41. The trough also includes side sections 48 which are joined to the sections 46 and 47.

In FIG. 3 a downwardly concave baffle 49 overlies the open area between the trough sections and is supported by the sidewalls of the hood. Baffle 49 is opposite side edges 50 and 51 positioned over the upwardly open collecting areas of the trough sections 46 and 47. Thus, baffle 49 completely overlies or overlaps the upwardly open area within the trough. The lower edges 50 and 51 of baffle 49 are spaced upwardly from the trough sections 46 and 47 as shown so that airflow spaces are defined between these lower marginal edges 50 and 51 of the baffle and trough. A water supply pipe 52 extends between the sidewalls of the hood at a position spaced upwardly of the upper surface of baffle 49. Pipe 52 is connected to a plurality of forwardly directed nozzles 53 and a plurality of rearwardly directed nozzles 54. These nozzles 53 and 54 are adapted to spray water in opposite directions toward the front and rear of the unit. The nozzles 53 and 54 are equally spaced along the length of the hood as appears in FIG. 4. These nozzles are preferably formed to emit a generally conical spray pattern as is the case with the nozzles in FIGS. 1 and 2. The pattern is such that a fine mist is directed toward the front wall 40, the upper wall section 42, the upper surface of baffle 49 on both sides thereof, and the rear wall 41 and upper wall portion 43.

The rear trough section 47 has a drain pipe 56 attached thereto.

In FIG. 3 a water circulation system of the same type illustrated in FIG. 1 may be utilized. Water is continuously supplied to the pipe 52 so as to maintain a fine mist spray of water within the hood whenever a fire is present in the cooking range. This fine mist spray impinges upon the front and rear walls as well as the inclined top wall sections and baffle 49. This water runs down the opposite upper surfaces of the baffle 49 and creates water curtains 57 and 58 between the lower edges of the baffle 50 and 51 and the upper surface of the liquid collected in the trough. Air, grease and soot-laden smoke particles pass upwardly within the opening of the trough and are constrained by baffle 49 to change direction and flow through the water curtains 57 and 58. The air and smoke is thus initially scrubbed by the water curtains 57 and 58 as is the case with the water curtain C in FIG. 2. Air and any remaining smoke particles then pass upwardly through the spaces between the upper opposite surfaces of baffle 49 and the front wall 40, upper wall section 42, and rear wall 41 and upper wall section 43. As the flow passes upwardly it is given a secondary scrubbing by passage through the water sprays in these passages. After passing the water sprays in these passages, the flow is upward and outward through the exhaust duct 45. A fan may be used if desired to induce an exhaust flow in the duct 45.

As is the case with the baffle structure in FIG. 2, the airflow is first upward through the annular trough and then lateral to the space between the baffle and the trough, for flow through the water curtain whereupon the flow direction is reversed for further upward passage through the water spray, although the second water curtain C is omitted in FIG. 3.

Structures as disclosed herein are highly effective in removing particles of grease, soot, dirt and the like from the smoke and airstream emitted above charcoal fires. The structures are also effective to remove odors from the airstream before it is passed to the exterior. The hood structure is kept relatively free of grease and soot deposits which, if not eliminated, produce a fire hazard. The constantly circulated water helps to minimize and restrict any flame above the grill and serves to substantially prevent the flame from ever reaching the exterior of the building through the hood structure. The annular trough structure provides cooling of all of the walls of the hood structure by virtue of heat transfer with the water flowing down the walls and in the troughs. Additional cooling is provided by the water spray in the air space within the hood. This further minimizes the possibility of grease and soot igniting within the hood because of heat transfer from he structure.

The drain system may be operated so that a substantial body of liquid is maintained in the trough as illustrated in the drawings. It is preferred, however, to operate the drain system so that only a thin film of liquid is present in the bottom of the trough.

I claim:

1. The combination of a ventilating hood and duct structure and a cooking stove including a downwardly facing hood having front, rear, and sidewall portions, an upwardly open trough positioned within said hood at the lower portion of said hood and extending around the front, rear and sidewall portions of said hood, said trough defining the margins of an open flow space between portions of said trough and positioned in a superimposed vertical alignment with the fire area of said cooking stove, an outlet duct fixed to the upper portion of said hood and communicating with the interior of said hood, a baffle surface positioned above said trough and extending over the entire airflow area between the front, rear and sidewall portions of said trough and in overlying and spaced relation to the trough whereby airflow spaces are defined between the baffle and the front and rear portions of said trough, nozzle means spaced above said baffle within said hood, and positioned to continuously direct water through said nozzle means substantially toward said front and rear wall portions above, and toward said baffle to create a water spray between the baffle and the front and rear wall structures of said hood above said baffle whereby water emitted from said nozzle means flows down said baffle to provide a water scrubbing curtain between said baffle and said trough for air and impurities passing between said baffle and trough, said water spray providing a secondary scrubbing action for air and impurities flowing upwardly between said baffle and the walls of said hood structure above said baffle, said water spray further providing a cooling and washing effect on the front and rear wall portions.

2. The structure of claim 1 wherein said baffle is generally downwardly concave in shape.

3. The structure of claim 1 wherein said nozzle means includes a plurality of nozzles equally spaced along the length of said hood and directed toward the front wall portion of said hood.

4. The structure of claim 1 characterized by and including water circulating and impurity separating means for continuously circulating water through said nozzle means, draining water and impurities from said trough, removing impurities from said water, and returning said water to said nozzles.

* * * * *